(12) United States Patent
Nelson et al.

(10) Patent No.: US 12,429,336 B1
(45) Date of Patent: Sep. 30, 2025

(54) MAGNETIC POSITIONING FOR VEHICLE GROUPS

(71) Applicant: The United States of America as represented by the Secretary of the Navy, Newport, RI (US)

(72) Inventors: Bryon A. Nelson, Charlestown, RI (US); Matthew J Sylvia, Fairhaven, MA (US)

(73) Assignee: The United States of America as represented by the Secretary of the Navy

( * ) Notice: Subject to any disclaimer, the term of this patent is extended or adjusted under 35 U.S.C. 154(b) by 245 days.

(21) Appl. No.: 18/370,045

(22) Filed: Sep. 19, 2023

(51) Int. Cl.
*G01C 21/08* (2006.01)

(52) U.S. Cl.
CPC .................................. *G01C 21/08* (2013.01)

(58) Field of Classification Search
CPC ..................................................... G01C 21/08
See application file for complete search history.

(56) References Cited

U.S. PATENT DOCUMENTS

| 10,139,821 B2 * | 11/2018 | Yamamura | ........... G05D 1/0278 |
| 2009/0128139 A1 * | 5/2009 | Drenth | ................... G01D 5/145 |
| | | | 324/207.22 |
| 2014/0165898 A1 * | 6/2014 | Cierpka | .................. G01S 15/89 |
| | | | 114/312 |

FOREIGN PATENT DOCUMENTS

| CN | 114815885 A | * | 7/2022 | ............. G05D 1/106 |
| CN | 115151881 A | * | 10/2022 | ............. B63B 29/02 |

\* cited by examiner

*Primary Examiner* — Mary Cheung
(74) *Attorney, Agent, or Firm* — James M. Kasischke; Jeffry C. Severson

(57) ABSTRACT

A system and method of use is provided for the magnetic positioning of at least one vehicle of a vehicle group. The method includes detecting a magnetic field of a target vehicle with a magnetometer of a tracking vehicle, measuring a total strength of the detected magnetic field with the magnetometer, determining the magnetic field strength of the target vehicle, identifying the target vehicle, and determining a position of the target vehicle based on a known position of the tracking vehicle at a time when the total magnetic field strength is measured.

19 Claims, 4 Drawing Sheets

MAGNETIC POSITIONING FOR VEHICLE GROUPS

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The invention relates to vehicle positioning, and more particularly to a system and method of use for the magnetic positioning of vehicle groups.

(2) Description of the Prior Art

A group of vehicles can operate in a group configuration whereby the movement and positioning of each of the vehicles in the group is based upon a collective motion. Each of the vehicles may have a unique position within the group and may move independent of the other vehicles.

A vehicle group may be plurality of surface vehicles moving on a water surface. In some applications of vehicle groups, such as during testing and prototyping of groups and group algorithms; determining the position of each of the vehicles is needed in order to compare an actual position to an expected or intended position.

In autonomous applications at sea, wherein each of the vehicles moves and repositions autonomously according to preprogrammed algorithms; the sea environment is not always conducive for personnel attempting to determine a position of each of the vehicles via direct visualization.

Accordingly, a method is needed for remotely determining a position of one or more vehicles of a vehicle group in addition to or instead of direct visualization.

SUMMARY OF INVENTION

It is therefore a general purpose and primary object of the present invention to provide a system and method of use for the magnetic positioning of a group of independent vehicles.

To attain the object of the present invention; one or more target vehicles of a vehicle group have a magnetic source with a known magnetic field strength and a detectable magnetic field (by a DC magnetic payload). By detecting, measuring, and identifying a respective magnetic field with a magnetometer of a tracking vehicle that has a known position; the position of a respective target vehicle may be determined.

Each target vehicle of a group of vehicles is identified by comparing a magnetic field strength of a specified target vehicle to known magnetic field strengths of the vehicles. For each identified target vehicle; the position of the vehicle is determined based on a known position of a magnetometer at a time when the magnetometer reads a peak magnetic field strength for the target vehicle when flying directly over the target vehicle.

BRIEF DESCRIPTION OF THE DRAWINGS

Features of illustrative embodiments may be understood from the accompanying drawings in conjunction with the description. The elements in the drawings may not be drawn to scale. Some elements and/or dimensions may be enlarged or minimized for the purpose of illustration and understanding of the disclosed embodiments.

DETAILED DESCRIPTION OF THE INVENTION

Each of the vehicles, employed for the present invention has a magnetic source payload and therefore produces a magnetic field with the magnetic field strength known for the magnetic source payload of the target vehicle. The magnetic field strength of the target vehicle is detectable by a magnetometer. The magnetic source payload is direct current magnetic payload that is detectable by the magnetometer.

Figure 1:
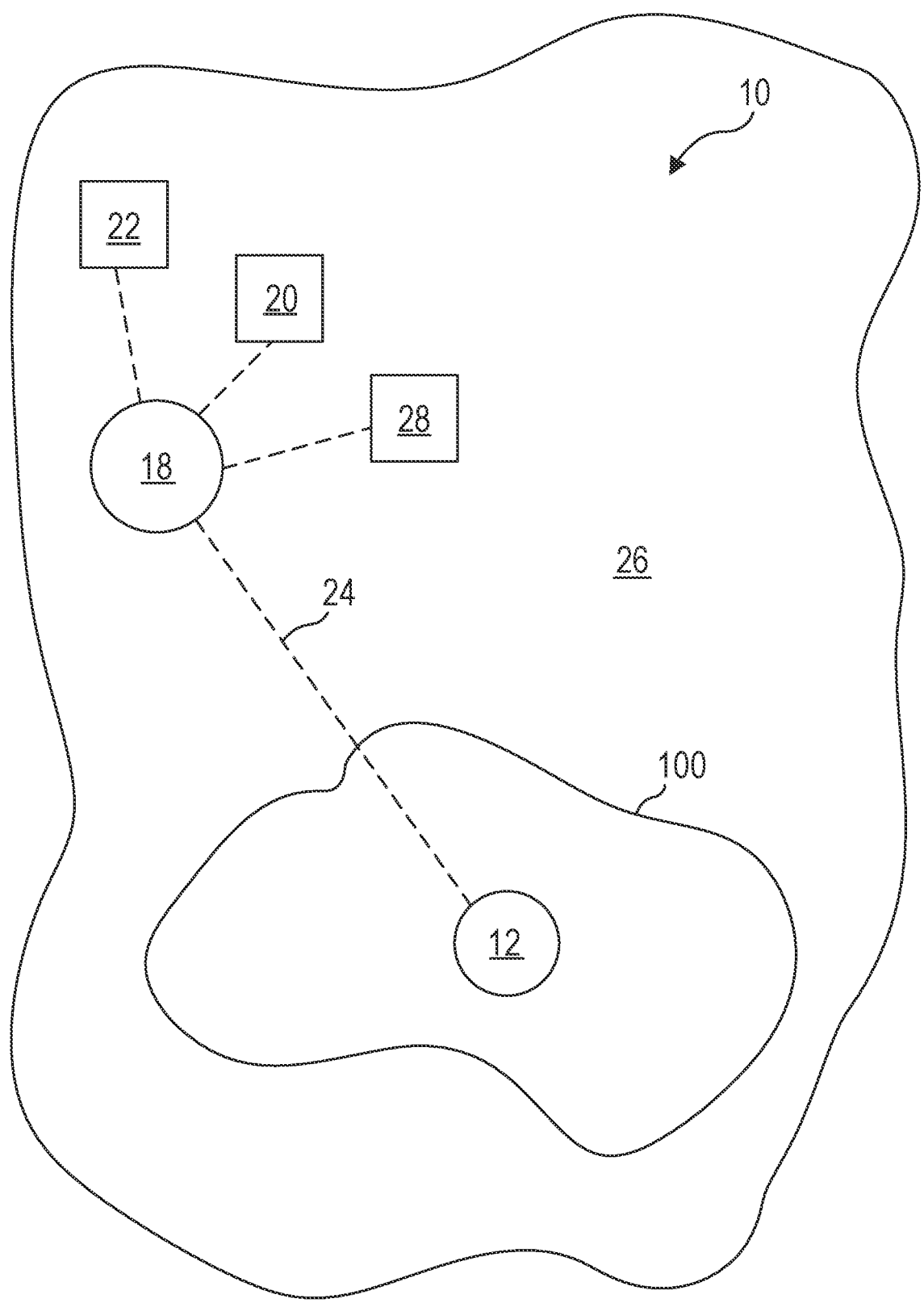
FIG. 1 depicts a first scenario for use of a target vehicle in the system and method of the present invention.

A system and method of use for magnetic positioning of vehicle groups is provided as the present invention. The system and method of use are described with reference to FIGS. 1-4 with FIG. 1 depicting a first scenario 10 that includes one target vehicle 12.

In the first scenario 10; the target vehicle 12 is positioned directly atop a water surface 100. The surface 100 may also be a solid surface (e.g. land) or the target vehicle may be in an atmospheric operating environment (e.g. air) with no change in elevation. The target vehicle 12 may be an autonomous vehicle that is programmed to move independently and/or as part of a vehicle group. The target vehicle 12 includes a magnetic source payload with a known magnetic field strength with the field strength.

A tracking vehicle 18 is equipped with a magnetometer 20 to detect magnetic fields and to measure magnetic field strengths and/or flux densities. The tracking vehicle 18 of the first scenario 10 is positioned within a proximity to the target vehicle 12 so that the magnetometer 20 can detect and measure a strength and/or flux density of a magnetic field of the magnetic payload of the target vehicle.

The magnetometer 20 can be a magnetometer that detects strength of a magnetic field or magnetic flux density. The tracking vehicle 18 is further equipped with a positioning system 22, such as a global positioning system or an inertial navigational unit.

A reading of the magnetometer 20 includes a magnetic field strength 24 (e.g., a source strength) of the magnetic field of the payload as well a magnetic field strength of the Earth 26. The reading may be a sum of the magnetic field strength 24 and the magnetic field strength of the Earth 26 and may be a measurement of magnetic flux density. The magnetic field strength of the Earth 26 for a given time and location in real-world coordinates is known. For example, data from an outside source of geophysical data can be obtained in real-time or at a later time.

Alternatively, a second magnetometer can measure the magnetic field strength of the Earth 26 and/or flux density at a separate location within proximity to the position of the magnetometer 20. The separate location would be outside a range of the magnetic field of the target vehicle 12.

Data of the measured magnetic field strength and/or flux density, as well as the data of the times when the magnetic field strength and/or magnetic flux density was measured is sent to a computing device 28 in communication with the tracking vehicle 18. The data from the positioning system 22, includes time-stamped latitudes, longitudes, and altitudes that provide real-world coordinates of the tracking vehicle 18. The computing device 28 can be aboard the tracking vehicle 18 or separate from the tracking vehicle. The computing device 28 comprises machine readable instructions stored in a non-transitory memory.

Figure 2:
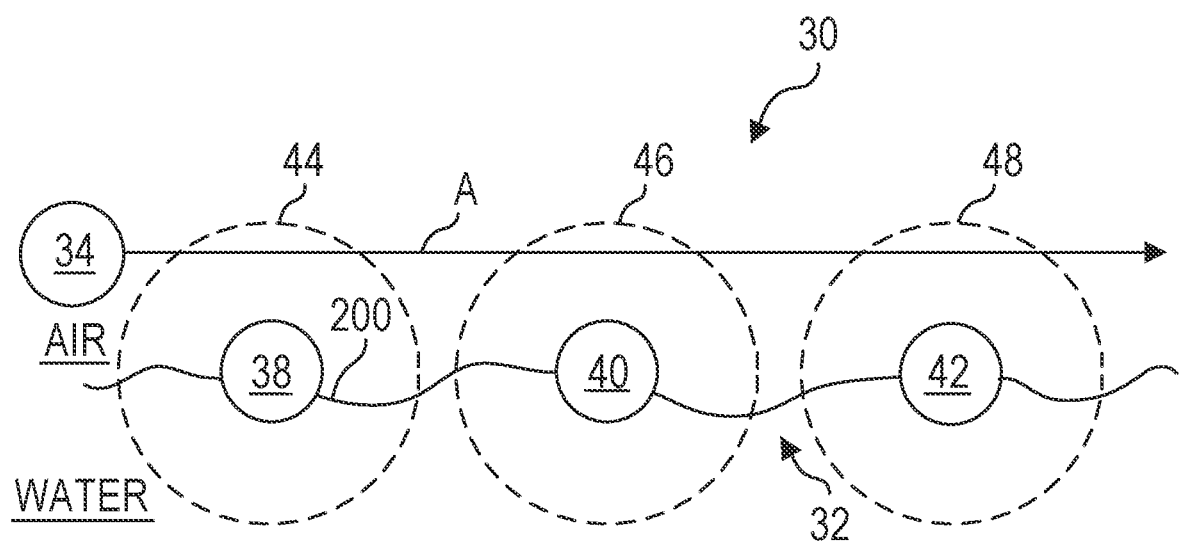
FIG. 2 depicts a second scenario for a plurality of target vehicles in the system and method of the present invention.

Referring to FIG. 2, a second scenario 30 is shown that includes more than one surface vehicle. In the second scenario 30, a tracking vehicle 34 traverses a path in direction "A". Alternatively, the path may traverse through air or the atmosphere. The tracking vehicle 34 may have the same structure and operating characteristics as tracking vehicle 18 of the first scenario 10. The tracking vehicle 34 is equipped with a magnetometer and a positioning system similar to the tracking vehicle 18 and is in communication with a computing device onboard the tracking vehicle or separate from the tracking vehicle.

The second scenario 30 includes multiple target vehicles of a vehicle group 32 including a first target vehicle 38, a second target vehicle 40 and a third target vehicle 42. Additional or fewer target vehicles may be included without departing from the scope of this invention. The first target vehicle 38 has a first magnetic source that generates a first magnetic field detectable within a first range 44. The second target vehicle 40 has a second payload that generates a second magnetic field detectable within a second range 46. The third target vehicle 42 has a third payload that generates a magnetic field which is detectable within a third range 48. The first, second, and third DC magnetic payloads of the first, second, and third vehicles are independently detectable by the magnetometer of the tracking vehicle 34 as long as there is an adequate separation between the target vehicles.

The first target vehicle 38, the second target vehicle 40 and the third target vehicle 42 are at least partially on a surface 200. In the second scenario 30, above the surface 200 is air and below the surface is water. The traverse path of which the tracking vehicle 34 intersects with the first range 44, the second range 46 and the third range 48. The magnetometer of the tracking vehicle 34 continuously measures magnetic field strength and/or magnetic flux density. When the tracking vehicle 34 is not within the first range 44, the second range 46 or the third range 48; the magnetic field strength (or magnetic flux density) measured by the magnetometer (e.g., a baseline) will be equal to the magnetic field strength of the Earth. When the tracking vehicle 34 passes through one of the first range 44, the second range 46 and the third range 48; the magnetic field strength measured by the magnetometer will be equal to a sum of the magnetic field strength of the Earth and a measured magnetic field strength of a respective target vehicle. A peak measured magnetic field strength for a particular magnetic field may indicate that the tracking vehicle is as close to a respective target vehicle as possible while traversing the path in direction "A".

Figure 3:
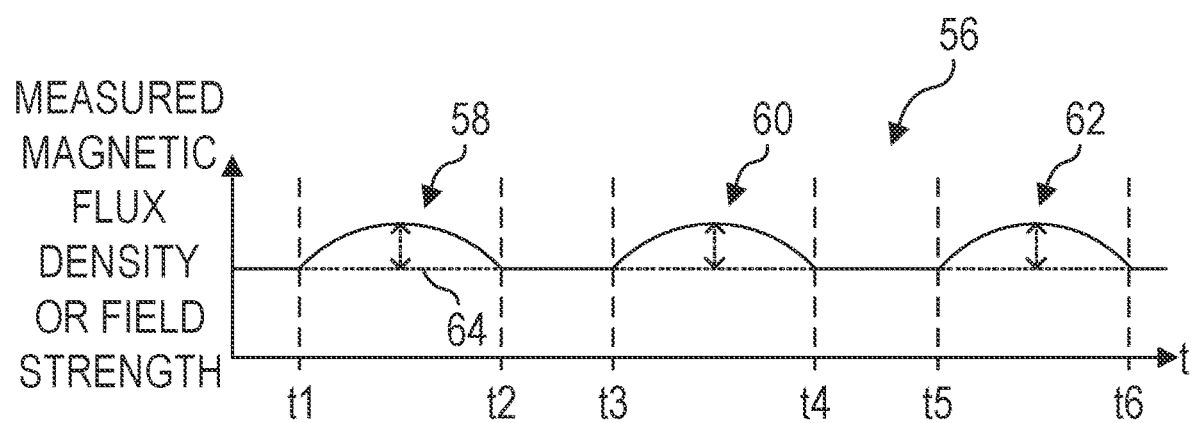
FIG. 3 depicts a timing diagram of measured magnetic flux density or field strength.

FIG. 3 depicts a timing diagram 56 corresponding to the second scenario 30 illustrates a magnetic flux density or field strength measured by the magnetometer of the tracking vehicle 34 versus time. Time increases from left to right along the abscissa of the timing diagram 56. Measured magnetic flux density or field strength increases in direction "A" in the timing diagram 56. The timing diagram 56 includes a plurality of local peaks with: a first local peak 58 corresponding to a first total magnetic field strength or flux density; a second local peak 60 corresponding to a second total magnetic field strength or flux density; and a third local peak 62 corresponding to a third total magnetic field strength or flux density.

Each of the local peaks correspond to a time when a total magnetic field strength for one of a plurality of target vehicles (the first vehicle 38, the second vehicle 40 and the third target vehicle 42) is measured. A baseline value 64 of the measured magnetic flux density will equal the magnetic flux density of the Earth.

For example, at time t1, a first rise in measured magnetic flux density or field strength is detected. The first local peak 58 occurs between the time t1 and the time t2; whereby, the difference between the magnetic flux density or field strength value of the first local peak and the baseline value 64 is a first magnetic flux density or field strength of a first source such as the first target vehicle 38.

At time t3, a second rise in measured magnetic flux density is seen. The second local peak 60 occurs between time t3 and time t4; whereby, the difference between the magnetic flux density or field strength value of the second local peak and the baseline value 64 is a second magnetic flux density or field strength of a second source such as the second target vehicle 40. At time t5, a third rise in measured magnetic flux density is seen. The third local peak 62 occurs between time t5 and time t6; whereby, the difference between the magnetic flux density or field strength value of the third local peak and the baseline value 64 is a third magnetic flux density or field strength of a third source such as the third target vehicle 42.

The measured magnetic flux density or field strength (as plotted on the timing diagram 56) rises and falls as the tracking vehicle 34 traverses the path in direction "A" with the effect of passing in and out of respective magnetic fields of each of the target vehicles. A value of the measured magnetic flux density or field strength may increase as the tracking vehicle 34 approaches a closest radial distance to a respective target vehicle and may decrease as the tracking vehicle departs from the closest radial distance. A local peak value of measured magnetic flux density or field strength corresponds to the closest radial distance to a respective target vehicle and with the GPS system can determine a position of the target vehicle.

The tracking vehicle 18 and the tracking vehicle 34 may be aerial vehicles and the target vehicles 12, 38, 40, and 42 may be surface vehicles. In another example, the tracking vehicle 18 and the tracking vehicle 34 may be surface vehicles or underwater vehicles and the target vehicles are aerial vehicles or underwater vehicles as long as the elevation of the target vehicle is constant. In further examples, more than one tracking vehicle may be used to determine the position of one or more target vehicles using its positioning system, such as one or more target vehicles being underwater vehicles.

Figure 4:
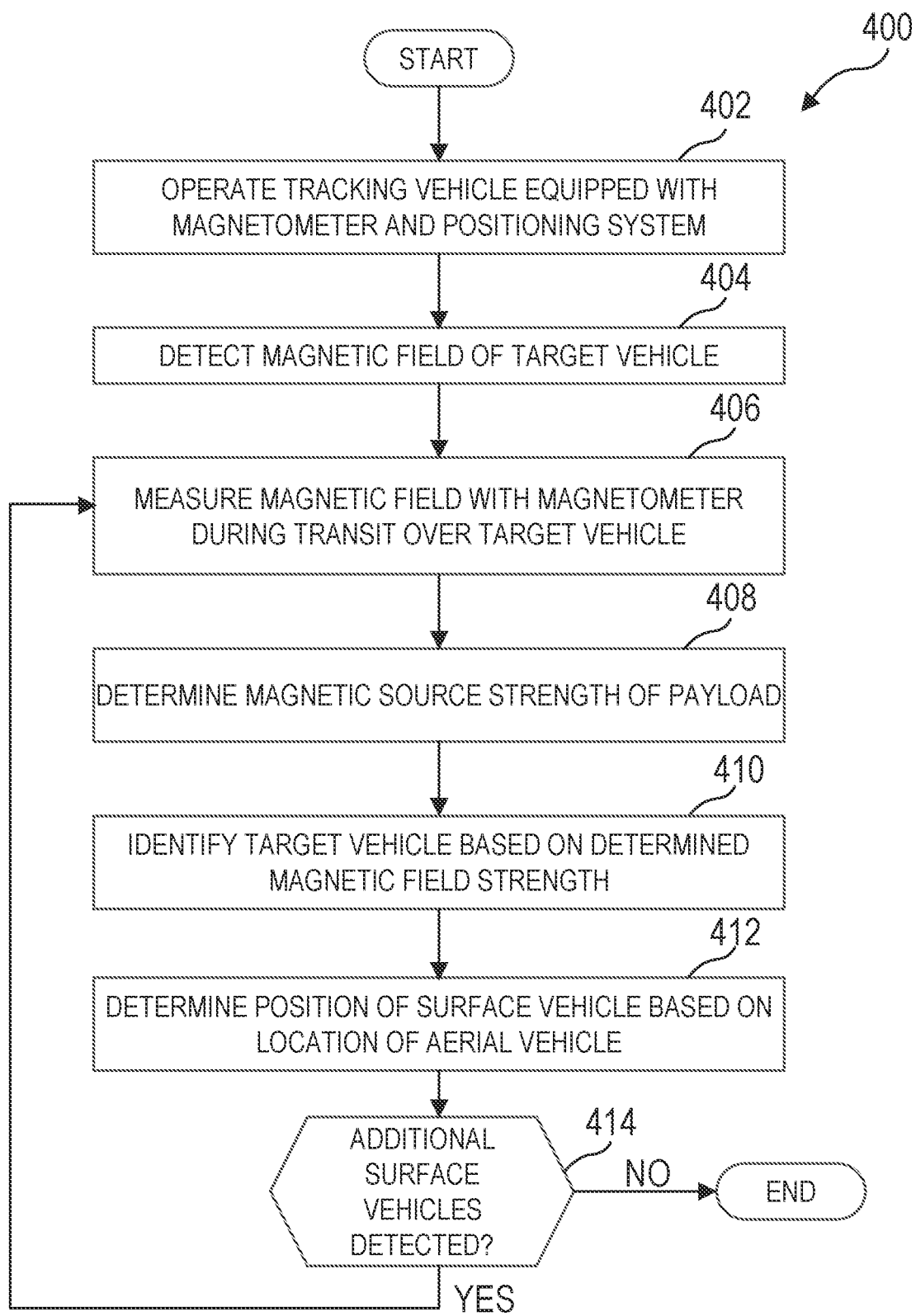
FIG. 4 depicts a flowchart illustrating a method of use for the present invention in order to determine the position of at least one target vehicle.

In FIG. 4, a flowchart illustrates a method 400 for determining a position of at least one target vehicle of a vehicle group. The method 400 can be executed by a computing device (e.g., computing device 28) and stored as executable instructions in a non-transitory memory. The computing device may be aboard a tracking vehicle and configured to perform the method 400 in real-time or near real-time (e.g., without intentional delay) or may be a separate computing device configured to perform the method at a time later than when data is initially recorded by the tracking vehicle. The data is stored in a memory either via the tracking vehicle or via the computing device until such time that the method 400 is executed.

At Step 402, the method 400 includes operating a tracking vehicle equipped with a magnetometer and a positioning system. The magnetometer detects magnetic field strength and/or flux density. The magnetometer communicates the detected magnetic field to the computing device. The positioning system determines and logs data of real-world coordinates (e.g., longitude and latitude) of the tracking vehicle, including an altitude defined by a distance from a surface. The operation of the tracking vehicle includes movement up to six degrees of freedom; whereby, the tracking vehicle may traverse air, in order to detect a magnetic field of at least one target vehicle as the tracking vehicle intersects each respective magnetic field.

At Step 404, the method 400 includes detecting a magnetic field of a target vehicle. The magnetometer of the tracking vehicle continuously measures magnetic field strength and/or flux density, including the magnetic field of the Earth. An increase in the magnetic field strength and/or flux density indicates detection of the magnetic field of the target vehicle. The increase in measured magnetic field strength and/or flux density occurs when the tracking vehicle intersects the magnetic field of the target vehicle. A baseline amount of measured magnetic flux density and/or field strength is equal to the magnetic flux density and/or field strength of the Earth.

At Step 406, the method 400 includes measuring the magnetic field strength or flux density with the magnetometer. The magnetometer of the tracking vehicle continuously measures strength and/or flux density, including measuring the magnetic field of the target vehicle as the vehicle intersects the corresponding magnetic field. The magnetic field strength and/or flux density measured by the magnetometer includes the target vehicle as well as the Earth.

The total magnetic flux density measured by the magnetometer of the tracking vehicle is calculated by Equation (1):

$$"B_s="B_t+"B_e \quad (1)$$

where "$B_s$" is the total sum of the measured magnetic flux density of the sensor, "$B_t$" is the measured magnetic flux density of the target magnetic payload and "$B_e$" is the measured magnetic flux density of the Earth. The measured magnetic flux density of the target magnetic payload is described in Equation (2):

$$B_t = \frac{\mu m}{4\pi r^3}(2\cos(\theta)\vec{a}_r + \sin(\theta)\vec{a}_\theta) \quad (2)$$

where "$B_t$" is the measured magnetic flux density due to the payload at a radial distance "r", "m" is the magnetic source strength of the magnetic payload of the target vehicle, "μ" is magnetic permeability of the medium, "θ" is the angle created between the axis of the dipole and the radial vector, "$\vec{a}_r$" is the unit vector in the r direction and "$\vec{a}_\theta$" is the unit vector in the θ direction where the coordinates are in a spherical system centered on the dipole source. When the tracking vehicle traverses a path perpendicular to the target vehicle; "θ" is assumed to be 90°; thereby, providing for a simplified Equation (3):

$$B_t = \frac{\mu m}{4\pi r^3} \quad (3)$$

where the variables are as defined above. In all examples, "r" is known based on data acquired by the positioning system of the tracking vehicle.

At Step 408, the method 400 includes determining the magnetic field source strength of the target vehicle. The magnetic field strength includes the magnetic field strength 24 of the target vehicle and the magnetic field strength 26 of the Earth. The determination of magnetic field strength 24 is provided by Equation (3):

$$B_m=M-E \quad (3)$$

where "$B_m$" is the magnetic field strength of the target vehicle, "M" is the magnetometer field strength reading, and "E" is the magnetic field strength of the Earth. The magnetic field strength (and/or flux density) of the Earth is known for a given time and/or position (in real-world coordinates of latitude and longitude). Data from an outside source of geophysical data that measures and logs the magnetic field of the Earth may be inputted to find the magnetic field strength of the target vehicle. A second magnetometer may measure the magnetic field strength and/or flux density of the Earth at a separate location within a given proximity to the position of interest but outside the range of the magnetic field of the surface vehicle.

At Step 410, the method 400 includes identifying the target vehicle based on the determined magnetic field strength of the vehicle. In order to identify the target vehicle from a plurality of vehicles; the determined magnetic field strength of the target vehicle is compared to the known magnetic source strength of each of the vehicles of the vehicle group. A known magnetic source strength that matches the determined magnetic field strength of the target vehicle corresponds to a particular one of the target vehicles and as such, the target vehicle is the particular one of the target vehicles.

At Step 412, the method 400 includes determining a position of the target vehicle in real-world coordinates based on a location of the tracking vehicle. Positioning system data, including longitude and latitude data, of the tracking vehicle may be logged, time stamped, and stored in memory. A time at which the local peak magnetic field strength of the target vehicle is measured, based on a local peak in a magnetic field strength reading of the magnetometer, is correlated to time data of the positioning system.

In this way, real-world coordinates of the tracking vehicle may be determined at the time in which the magnetic field strength of the target vehicle was measured. The latitude and longitude of the tracking vehicle may be the latitude and longitude of the target vehicle; thereby, defining real-world coordinates for the target vehicle.

At Step 414, the method 400 determines whether additional target vehicles are detected. As explained with reference to FIG. 1, one vehicle is present, detected, and localized. And as explained with reference to FIG. 2, multiple vehicles are present, detected, and localized. When data of the magnetometer is sent to a computing device and analyzed after data acquisition; the determination of the number of target vehicles is based on how many local peaks of measured magnetic field strength or flux density are detected by a magnetometer. When data from the magnetometer is analyzed in real-time or near real-time; continuous or repeated readings from the magnetometer indicate the detection of subsequent target vehicles.

If an additional target vehicle is detected, the method 400 returns to Step 406 to measure the magnetic field strength and/or flux density of the second vehicle; thereby, repeating the steps of the method to locate the second target vehicle.

Detection, measurement, and localization, as described at Step 404 through Step 410, may be repeated for each of one or more second target vehicles. In this way, the steps of the method 400 may be repeated for each detected target vehicle; thereby, providing location data of each of the identified target vehicles within the vehicle group. Once the target vehicles have been localized by the method 400 and no additional target vehicles are present, the use of the method is ended or completed.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A system for magnetic positioning of a vehicle group, said system comprising:
   at least one target vehicle in the vehicle group;
   a tracking vehicle equipped with a magnetometer and a positioning system; and
   a computing device communicatively coupled to said tracking vehicle wherein said computing device is configured with instructions in a non-transitory memory that, when executed, allows said computing device to determine a magnetic field strength of said at least one target vehicle based on data from said magnetometer with a result of identifying said at least one target vehicle;
   wherein a position of said at least one target vehicle is determinable based on the identification of said at least one target vehicle.

2. The system in accordance with claim 1, wherein said magnetometer is configured to detect a magnetic field of said at least one target vehicle and is configured to measure a strength of the magnetic field.

3. The system in accordance with claim 2, wherein said system is configured to localize said tracking vehicle to coordinates of a latitude, a longitude and an altitude.

4. The system in accordance with claim 3, wherein a total strength of the magnetic field measured by said magnetometer is the magnetic field strength of said at least one target vehicle and the magnetic field strength of the Earth.

5. The system in accordance with claim 4, wherein the total strength of the magnetic field has a relationship with a radial distance between the magnetometer and said at least one target vehicle.

6. The system in accordance with claim 5, wherein determining the position of said at least one target vehicle includes obtaining longitude and latitude data of said tracking vehicle as determined by the positioning system when the magnetometer measures the total strength of the magnetic field.

7. The system in accordance with claim 6, wherein said computing device is configured with instructions that when executed cause said computing device to determine respective magnetic field strengths of at least one additional target vehicle, to identify said at least one additional target vehicle, and to localize said at least one additional target vehicle.

8. A method for magnetic positioning of a vehicle group, said method comprising the steps:
   operating an aerial vehicle equipped with a magnetometer and a positioning system;
   detecting a first magnetic field of a first surface vehicle with the magnetometer;
   measuring a first total magnetic field strength with the magnetometer;
   determining a first strength of the first magnetic field based on the first total magnetic field strength;
   identifying the first surface vehicle of the vehicle group; and
   localizing the first surface vehicle to real-world coordinates.

9. The method in accordance with claim 8, wherein said step of operating the aerial vehicle further comprises traversing a path within a range of the first magnetic field.

10. The method in accordance with claim 9, further comprising the steps of:
    detecting a second magnetic field of a second surface vehicle with the magnetometer;
    measuring a second total magnetic field strength with the magnetometer;
    determining a second strength of the second magnetic field based on the second total magnetic field strength;
    identifying the second surface vehicle of the vehicle group; and
    localizing the second surface vehicle to real-world coordinates.

11. The method in accordance with claim 10, wherein said step of localizing the first surface vehicle to real-world coordinates comprises determining real-world coordinates of the aerial vehicle with the positioning system for a time corresponding to when the first total magnetic field strength is measured by the magnetometer.

12. The method in accordance with claim 11, wherein the first total magnetic field strength is the first strength of the first surface vehicle and the magnetic field strength of the Earth specific to the time corresponding to when the first total magnetic field strength is measured by the magnetometer.

13. A method for localization of a target vehicle, said method comprising the steps of:
    detecting a magnetic field of the target vehicle with a magnetometer of a tracking vehicle;
    measuring a total strength of the detected magnetic field with the magnetometer;
    determining magnetic field strength of the target vehicle;
    identifying the target vehicle based on the determined magnetic field strength; and
    determining a position of the target vehicle based on a known position of the tracking vehicle at a time when the total strength of the detected magnetic field is measured.

14. The method in accordance with claim 13, wherein said step of detecting the magnetic field of the target vehicle further comprises the tracking vehicle traversing a path intersecting the magnetic field.

15. The method in accordance with claim 14, wherein the total strength of the detected magnetic field is a sum of the magnetic field strength of the target vehicle and the magnetic field strength of the Earth.

16. The method in accordance with claim 15, wherein said step of determining the magnetic field strength of the target vehicle comprises determining a difference between the total strength of the detected magnetic field and the magnetic field strength of the Earth.

17. The method in accordance with claim 16, wherein the known position of the tracking vehicle is based on data from a positioning system of the tracking vehicle.

18. The method in accordance with claim 17, wherein said step of identifying the target vehicle further comprises matching the determined magnetic field strength of the target vehicle with a known magnetic field strength of one of a plurality of target vehicles.

19. The method in accordance with claim 18, wherein the target vehicle is a surface vehicle and the tracking vehicle is an aerial vehicle.

\* \* \* \* \*